US007651785B2

(12) United States Patent
Takei et al.

(10) Patent No.: US 7,651,785 B2
(45) **Date of Patent: *Jan. 26, 2010**

(54) TIN-PLATED PRODUCT

(75) Inventors: Hirofumi Takei, Honjo (JP); Hiroshi Miyazawa, Honjo (JP); Kentaro Asai, Honjo (JP)

(73) Assignee: Dowa Mining Co., Ltd., Tokyo (JP)

(*) Notice: Subject to any disclaimer, the term of this patent is extended or adjusted under 35 U.S.C. 154(b) by 557 days.

This patent is subject to a terminal disclaimer.

(21) Appl. No.: 11/235,416

(22) Filed: Sep. 26, 2005

(65) Prior Publication Data

US 2006/0068220 A1 Mar. 30, 2006

(30) Foreign Application Priority Data

Sep. 29, 2004 (JP) ............................ 2004-283071

(51) Int. Cl.
*B32B 15/01* (2006.01)
*H01R 13/03* (2006.01)

(52) U.S. Cl. ....................... 428/647; 428/646; 428/929; 439/886; 439/887; 205/109

(58) Field of Classification Search ....................... None
See application file for complete search history.

(56) References Cited

U.S. PATENT DOCUMENTS 4,652,349 A * 3/1987 Behringer et al. ........... 205/109
5,028,492 A * 7/1991 Guenin ....................... 428/614
5,916,695 A * 6/1999 Fister et al. ................. 428/647
7,132,172 B2 * 11/2006 Buresch et al. ............. 428/556
2006/0216475 A1 * 9/2006 Miyazawa et al. .......... 428/141

FOREIGN PATENT DOCUMENTS

DE 10261303 B3 * 6/2004
EP 1 281 789 A1 2/2003
GB 2217347 * 10/1989
JP 53-11131 2/1978
JP 54-45634 4/1979
JP 61-227196 10/1986
JP 63-145819 6/1988

(Continued)

OTHER PUBLICATIONS

Abstract for JP 03-197692, no date.*

(Continued)

*Primary Examiner*—John J Zimmerman
(74) *Attorney, Agent, or Firm*—Bachman & LaPointe, P.C.

(57) ABSTRACT

There is provided a tin-plated product which has a small deterioration of contact resistance with age, an excellent wear resistance and a low coefficient of friction. A coating of a composite material, which contains 0.1 to 1.0 wt % of carbon particles dispersed in a tin layer and which has a thickness of 0.5 to 10.0 μm, preferably 1.0 to 5.0 μm, is formed as the outermost layer of a substrate. Thus, the coefficient of dynamic friction between the tin-plated products of the same kind is 0.20 or less, and the coefficient of dynamic friction between the tin-plated product and a reflow tin-plated product is 0.20 or less, while the contact resistance is 1 mΩ or less.

3 Claims, 1 Drawing Sheet

FOREIGN PATENT DOCUMENTS

| | | | | |
|---|---|---|---|---|
| JP | 3-197692 | A | | 8/1991 |
| JP | 05-123772 | | * | 5/1993 |
| JP | 10-46363 | A | | 2/1998 |
| JP | 2001-526734 | | | 12/2001 |
| JP | 2004-68026 | A | | 3/2004 |
| WO | WO 97/22472 | A1 | | 6/1997 |
| WO | WO 98/23444 | | * | 6/1998 |

OTHER PUBLICATIONS

Machine translation of JP 10-046363, no date.*
Machine translation of JP 2004-068026, no date.*

* cited by examiner

FIGURE
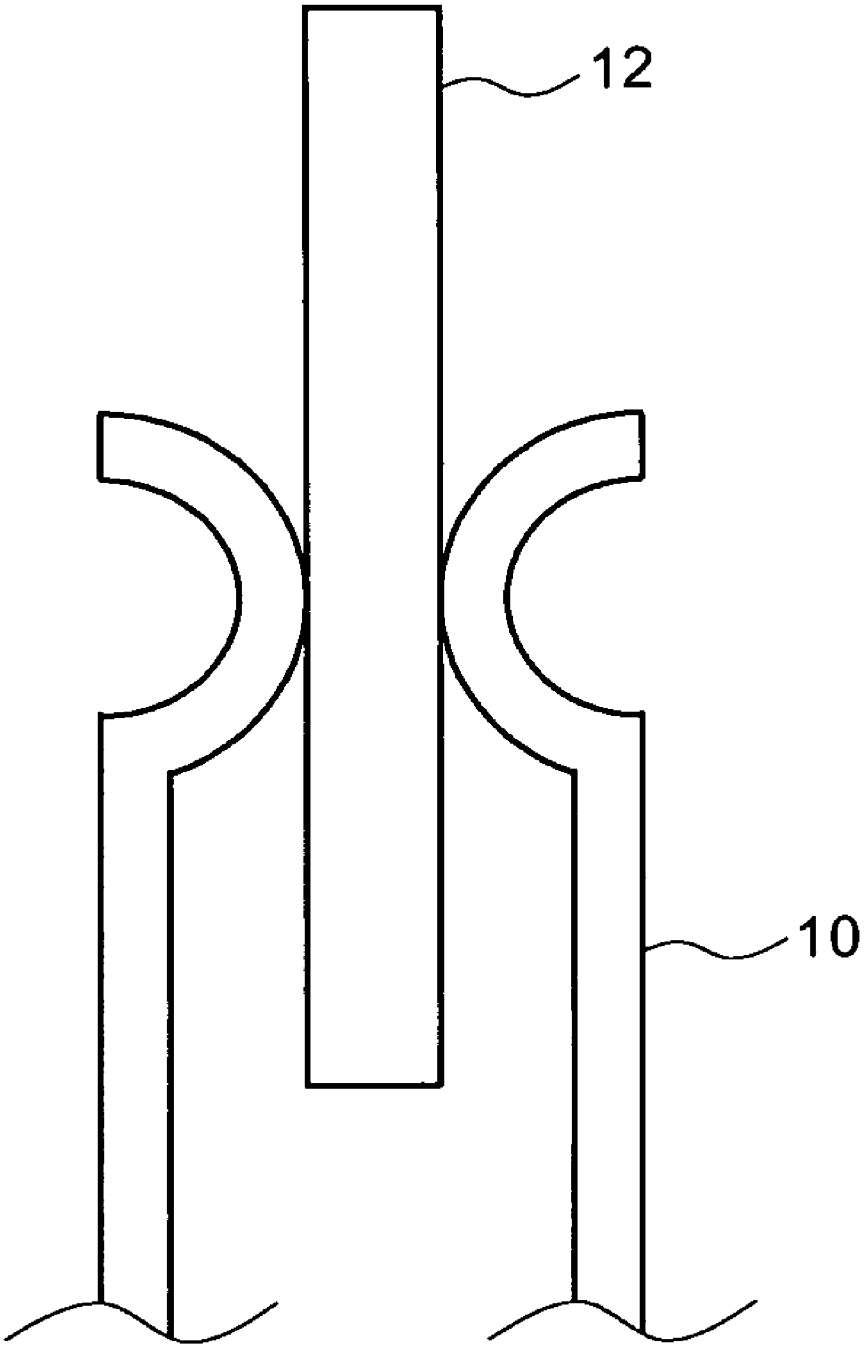

TIN-PLATED PRODUCT

BACKGROUND OF THE INVENTION

1. Field of the Invention

The present invention generally relates to a tin-plated product. More specifically, the invention relates to a tin-plated product used as the material of an insertable connecting terminal or the like.

2. Description of the Prior Art

As conventional materials of insertable connecting terminals, there are used tin-plated products wherein a tin coating layer is formed as the outermost layer of a conductive material, such as copper or a copper alloy. In particular, tin-plated products have a small deterioration of contact resistance with age, and are used as the materials of connecting terminals for automotive vehicles and so forth which are used in a great environmental load.

However, there is a problem in that tin-plated products can not be used as insertable connecting terminals for a long time since they are soft and easy to wear. In order to eliminate this problem, it is proposed that a coating of a composite material, which contains wear resistant or lubricating solid particles in a metal matrix containing tin as a principal component, is formed on a conductive substrate by electroplating to improve the mechanical wear resistance of a tin-plated product (see, e.g., Japanese Patent Laid-Open Nos. 54-45634, 53-11131 and 63-145819), and there is proposed a connecting terminal to which such a composite coating is applied (see, e.g., Japanese Patent Unexamined Publication No. 2001-526734 (National Publication of Translated Version of PCT/US96/19768). It is also proposed that a coating containing tin or tin/lead and graphite dispersed therein is formed on a conductive substrate to form a conductive coating having an excellent wear resistance (see, e.g., Japanese Patent Laid-Open No. 61-227196).

However, there is a problem in that the conventional tin-plated products produced by the above described methods have a relatively high coefficient of friction although they have an excellent wear resistance. Therefore, if such a tin-plated product is used as the material of an insertable connecting terminal, there is a problem in that the inserting force applied thereto increases

SUMMARY OF THE INVENTION

It is therefore an object of the present invention to eliminate the aforementioned problems and to provide a tin-plated product which has a small deterioration of contact resistance with age, an excellent wear resistance and a low coefficient of friction.

In order to accomplish the aforementioned and other objects, the inventors have diligently studied and found that it is possible to produce a tin-plated product which has a small deterioration of contact resistance with age, an excellent wear resistance and a low coefficient of friction, if a coating of a composite material containing carbon particles dispersed in a tin layer is formed on a substrate so as to have a thickness of 0.5 to 10.0 μm, preferably 1.0 to 5.0 μm. Thus, the inventors have made the present invention.

According one aspect of the present invention, a tin-plated product comprises: a substrate; and a coating of a composite material containing carbon particles dispersed in a tin layer, the coating being formed on the substrate and having a thickness of 0.5 to 10.0 μm, preferably 1.0 to 5.0 μm. In this tin-plated product, the coating is preferably formed as an outermost layer of the tin-plated product. The content of the carbon particles in the coating is preferably in the range of from 0.1 wt % to 1.0 wt %.

According to another aspect of the present invention, a connecting terminal comprises: a female terminal; and a male terminal to be fitted into the female terminal, wherein at least a part of at least one of the female and male terminals contacting the other terminal thereof is made of the above described tin-plated product.

According to the present invention, it is possible to produce a tin-plated product which has a small deterioration of contact resistance with age, an excellent wear resistance and a low coefficient of friction.

BRIEF DESCRIPTION OF THE DRAWING

FIGURE is an illustration for explaining an example of a connecting terminal using a tin-plated product according to the present invention.

DESCRIPTION OF THE PREFERRED EMBODIMENTS

In a preferred embodiment of a tin-plated product according to the present invention, a coating of a composite material, which contains 0.1 to 1.0 wt % of carbon particles dispersed in a tin layer and which has a thickness of 0.5 to 10.0 μm, preferably 1.0 to 5.0 μm, is formed on a substrate. If the thickness of the coating of the composite material is greater than 10 μm, the abrasion depth and abrasion width of the tin-plated product during sliding are increased to increase the wearing contact area thereof, so that the contact resistance thereof increases and the coefficient of friction thereof also increases. Therefore, the thickness of the coating of the composite material is preferably 10 μm or less, and more preferably 5 μm or less. On the other hand, if the thickness of the coating of the composite material is less than 0.5 μm, the coefficient of friction thereof decreases, but the deterioration of contact resistance with age is increased by the oxidation of tin or the like. Therefore, the thickness of the coating of the composite material is preferably 0.5 μm or more, and more preferably 1.0 μm or more.

As shown in FIGURE, if at least one of a female terminal 10 of a connecting terminal and a male terminal 12 fitted into the female terminal 10 is formed of a tin-plated product according to the present invention, it is possible to provide a connecting terminal which has a small deterioration of contact resistance with age, an excellent wear resistance and a low coefficient of friction. In this case, only a part of at least one of the female terminal 10 and male terminal 12 contacting the other terminal may be formed of a tin-plated product according to the present invention.

Examples of a tin-plated product according to the present invention will be described below in detail.

Examples 1-3 and Comparative Examples 1, 2

First, each of brass plates (brass C2600) serving as substrates (raw materials) and having a thickness of 0.3 mm was put into a nickel plating solution comprising nickel (90 g/l), nickel chloride (20 g/l) and boron (5 g/l) to be electroplated with nickel at a temperature of 50° C. and at a current density of 5 $A/dm^2$ so as to form a nickel coating layer having a thickness of 1 μm thereon.

In addition, 80 g/l of scale-shaped (or flake-shaped) graphite particles (Graphite SGP-3 produced by SEC Corporation) having a mean particle diameter of 3.4 μm and a particle size distribution of 0.9 to 11 μm were added and dispersed in a tin plating solution (comprising alkylarylsulfonic acid (produced by German Shredder Corporation) (130 ml/l), tin alkylarylsulfonate (300 ml/l) and MST-400 (60 ml/l)). Furthermore, the mean particle diameter of the graphite particles was obtained as follows. First, 0.5 g of graphite particles were dispersed in 50 g of a solution containing 0.2 wt % of sodium hexametaphosphate, and further dispersed by ultrasonic waves. Then, particle diameters of the graphite particles in a distribution based on volume were measured by means of a laser light scattering particle-size distribution measuring device, and a particle diameter at 50% in a cumulative distribution was assumed as the mean particle diameter.

Then, each of the nickel-plated substrates was put into the above described tin plating solution to be electroplated at a temperature of 25° C. and at a current density of 2 A/$dm^2$ using a tin plate as an anode while stirring the solution with a stirrer to produce a tin-plated product wherein a composite coating of tin and graphite particles having a thickness shown in Table 2 was formed on the nickel plating. Furthermore, the thickness of the composite coating was calculated from a mean value of thicknesses at eight points by the fluorescent X-ray spectrometric method for measuring thickness.

After the tin-plated produce thus obtained was cleaned by ultrasonic cleaning to remove graphite particles adhering to the surface thereof, the content of carbon in the composite coating of the tin-plated product was calculated, and the coefficient of friction, contact resistance and wear resistance of the tin-plated product were evaluated.

Test pieces were cut out of each of the obtained tin-plated products (containing the substrates) to be prepared for analyses of Sn and C, respectively. The content by weight (X wt %) of Sn in the test piece was obtained by the plasma spectroscopic analysis by means of an ICP device (IRIS/AR produced by Jarrell Ash Corporation), and the content by weight (Y wt %) of C in the test piece was obtained by the combustion infrared-absorbing analysis method by means of a carbon/sulfur microanalyzer (EMIA-U510 produced by HORIBA, Ltd.). Then, the content by weight of C in the tin coating was calculated as Y/(X+Y).

As coefficients of friction of each of the tin-plated products, the coefficient of dynamic friction between test pieces cut out of each of the obtained tin-plated products, and the coefficient of dynamic friction between the test piece and a tin-plated product treated by a reflow treatment were obtained. Furthermore, as the tin-plated product treated by the reflow treatment, there was used a tin-plated product treated by the reflow treatment after a tin coating layer having a thickness of 1 μm was formed on a substrate of Cu—Ni—Sn alloy (NB-109-EH material produced by Dowa Mining Co., Ltd.) having a thickness of 0.25 mm. The coefficient (μ) of dynamic friction between the test pieces was calculated as follows. One of two test pieces was indented to be used as an indenter (R: 3 mm, three indents), and the other test piece was used as an evaluating sample. A load cell was used for sliding the indenter at a moving speed of 100 mm/min while pushing the indenter against the evaluating sample at a load of 15 N. Thus, a force (F) applied in horizontal directions was measured for calculating the coefficient (μ) from μ=F/N. Similarly, the coefficient (μ) of dynamic friction between the test piece and the tin-plated product treated by the reflow treatment was calculated from μ=F/N by measuring a force (F) applied in horizontal directions when sliding an indenter, which was obtained by indenting the tin-plated product treated by the reflow treatment, at a moving speed of 100 mm/min while pushing the indenter against the test piece at a load of 15 N.

As the contact resistances of each of the tin-plated products, there were measured an initial contact resistance, a contact resistance after being heated at 160° C. for 150 hours, and a contact resistance after being held at 85° C. and at a humidity of 85% for 14 days. Each of the contact resistances was measured at a sliding load of 100 gf when the sliding load was changed from 0 gf to 100 gf at an open voltage of 200 mV and at a current of 10 mA by the alternating four-terminal method based on JIS C5402.

The wear resistance of each of the tin-plated products was evaluated by measuring an abrasion width and an abrasion depth by observing the tin-plated products by means of a laser super-depth microscope (VK-8500 produced by KEYENCE CORPORATION) after an indenter of SUS ball having a diameter of 10 mm was slid on the tin-plated product at a load of 100 gf once and twenty times.

These results are shown Tables 1 through 6. As shown in these tables, when the thickness of the composite coating is in the range of from 1.1 μm to 6.6 μm as Examples 1 thorough 3, the coefficient of dynamic friction between the test piece and the tin-plated product treated by the reflow treatment is in the range of from 0.13 to 0.15. In particular, when the thickness of the composite coating is in the range of from 1.1 μm to 4.0 μm as Examples 1 and 2, the coefficient of dynamic friction between the test pieces is also in the range of from 0.13 to 0.18, so that it is possible to obtain a low coefficient of dynamic friction while maintaining an excellent wear resistance. However, when the thickness of a composite coating is in the range of from 11.8 μm to 16.7 μm as Comparative Examples 1 and 2, each of the coefficients of dynamic friction is a high value of 0.2 or more.

TABLE 1

| | Carbon Particles | | | |
|---|---|---|---|---|
| | Shape | Mean Diameter (μm) | Particle Size Distribution (μm) | Suspended Carbon (g/L) |
| Ex. 1 | scale | 3.4 | 0.9-11 | 80 |
| Ex. 2 | scale | 3.4 | 0.9-11 | 80 |
| Ex. 3 | scale | 3.4 | 0.9-11 | 80 |
| Comp. 1 | scale | 3.4 | 0.9-11 | 80 |
| Comp. 2 | scale | 3.4 | 0.9-11 | 80 |
| Ex. 4 | scale | 3.4 | 0.9-11 | 80 |
| Comp. 3 | scale | 3.4 | 0.9-11 | 80 |
| Ex. 5 | scale | 5.8 | 1.1-18.5 | 80 |
| Ex. 6 | scale | 5.8 | 1.1-18.5 | 80 |
| Ex. 7 | scale | 5.8 | 1.1-18.5 | 80 |
| Ex. 8 | scale | 5.8 | 1.1-18.5 | 80 |
| Comp. 4 | scale | 5.8 | 1.1-18.5 | 80 |
| Ex. 9 | scale | 8.3 | 1.1-31 | 80 |
| Ex. 10 | scale | 8.3 | 1.1-31 | 80 |
| Comp. 5 | scale | 8.3 | 1.1-31 | 80 |
| Comp. 6 | scale | 8.3 | 1.1-31 | 80 |
| Comp. 7 | scale | 8.3 | 1.1-31 | 80 |

TABLE 2

| | Plating | | | |
|---|---|---|---|---|
| | Type of Plating Solution | Coating | Thickness of SnC (μm) | Content of C (wt %) |
| Ex. 1 | alkylarylsulfonic acid bath | Ni/SnC | 1.1 | 0.70 |
| Ex. 2 | alkylarylsulfonic acid bath | Ni/SnC | 4.0 | 0.69 |
| Ex. 3 | alkylarylsulfonic acid bath | Ni/SnC | 6.6 | 0.54 |

TABLE 2-continued

| | Plating | | | |
|---|---|---|---|---|
| | Type of Plating Solution | Coating | Thickness of SnC (μm) | Content of C (wt %) |
| Comp. 1 | alkylarylsulfonic acid bath | Ni/SnC | 11.8 | 0.70 |
| Comp. 2 | alkylarylsulfonic acid bath | Ni/SnC | 16.7 | 0.95 |
| Ex. 4 | alkylarylsulfonic acid bath | Ni/Sn/SnC | Sn:1 SnC:1 | — |
| Comp. 3 | alkylarylsulfonic acid bath | Ni/SnC/Sn | SnC:1 Sn:1 | — |
| Ex. 5 | alkylarylsulfonic acid bath | Ni/SnC | 1.2 | 0.86 |
| Ex. 6 | alkylarylsulfonic acid bath | Ni/SnC | 4.0 | 0.24 |
| Ex. 7 | alkylarylsulfonic acid bath | Ni/SnC | 5.6 | 0.23 |
| Ex. 8 | alkylarylsulfonic acid bath | Ni/SnC | 9.2 | 0.22 |
| Comp. 4 | alkylarylsulfonic acid bath | Ni/SnC | 12.7 | 1.05 |
| Ex. 9 | alkylarylsulfonic acid bath | Ni/SnC | 1.5 | 0.57 |
| Ex. 10 | alkylarylsulfonic acid bath | Ni/SnC | 3.4 | 0.17 |
| Comp. 5 | alkylarylsulfonic acid bath | Ni/SnC | 5.7 | 0.09 |
| Comp. 6 | alkylarylsulfonic acid bath | Ni/SnC | 8.7 | 0.19 |
| Comp. 7 | alkylarylsulfonic acid bath | Ni/SnC | 13.7 | 0.87 |

TABLE 3

| | Carbon Particles | | | |
|---|---|---|---|---|
| | Shape | Mean Diameter (μm) | Particle Size Distribution (μm) | Suspended Carbon (g/L) |
| Ex. 11 | soil | 4.0 | 0.6-37 | 80 |
| Ex. 12 | soil | 4.0 | 0.6-37 | 80 |
| Comp. 8 | soil | 4.0 | 0.6-37 | 80 |
| Comp. 9 | soil | 4.0 | 0.6-37 | 80 |
| Comp. 10 | soil | 4.0 | 0.6-37 | 80 |
| Comp. 11 | — | — | — | 0 |
| Comp. 12 | — | — | — | 0 |
| Comp. 13 | — | — | — | 0 |
| Comp. 14 | — | — | — | 0 |

TABLE 4

| | Plating | | | |
|---|---|---|---|---|
| | Type of Plating Solution | Coating | Thickness of SnC (μm) | Content of C (wt %) |
| Ex. 11 | alkylarylsulfonic acid bath | Ni/SnC | 0.9 | 0.60 |
| Ex. 12 | alkylarylsulfonic acid bath | Ni/SnC | 3.3 | 0.40 |
| Comp. 8 | alkylarylsulfonic acid bath | Ni/SnC | 6.1 | 0.28 |
| Comp. 9 | alkylarylsulfonic acid bath | Ni/SnC | 9.2 | 0.42 |
| Comp. 10 | alkylarylsulfonic acid bath | Ni/SnC | 16.6 | 0.75 |
| Comp. 11 | alkylarylsulfonic acid bath | Ni/Sn | 1.4 (Sn) | — |
| Comp. 12 | sulfuric acid | Sn | 1.1 | — |

TABLE 4-continued

| | Plating | | | |
|---|---|---|---|---|
| | Type of Plating Solution | Coating | Thickness of SnC (μm) | Content of C (wt %) |
| | bath | | (Sn) | |
| Comp. 13 | alkylarylsulfonic acid bath | Cu/SnNi/Sn | 0.4 (Sn) | |
| Comp. 14 | alkylarylsulfonic acid bath | Cu/SnNi/Sn | 0.1 (Sn) | |

TABLE 5

| | Coefficient of Friction | | Contact Resistance (mΩ) | | |
|---|---|---|---|---|---|
| | Same Kind | Reflow Sn | Initial | 160° C. 150 h | After 14 days at 85° C., 85% |
| Ex. 1 | 0.13 | 0.13 | 0.71 | 1.57 | 1.32 |
| Ex. 2 | 0.18 | 0.17 | 0.50 | 0.60 | 0.68 |
| Ex. 3 | 0.24 | 0.15 | — | — | — |
| Comp. 1 | 0.28 | 0.20 | — | — | — |
| Comp. 2 | 0.38 | 0.30 | 0.73 | 0.80 | 0.62 |
| Ex. 4 | — | 0.16 | 0.68 | — | 0.93 |
| Comp. 3 | — | 0.28 | 0.72 | — | 0.64 |
| Ex. 5 | 0.17 | 0.12 | 0.94 | 1.52 | 0.76 |
| Ex. 6 | 0.19 | 0.18 | 0.61 | 1.20 | 0.70 |
| Ex. 7 | 0.37 | 0.18 | — | — | — |
| Ex. 8 | 0.44 | 0.17 | — | — | — |
| Comp. 4 | 0.54 | 0.37 | 0.64 | 0.86 | 0.67 |
| Ex. 9 | 0.18 | 0.13 | 0.61 | 1.20 | 0.66 |
| Ex. 10 | 0.20 | 0.13 | 0.47 | 0.25 | 0.62 |
| Comp. 5 | 0.41 | 0.21 | — | — | — |
| Comp. 6 | 0.46 | 0.29 | — | — | — |
| Comp. 7 | 0.56 | 0.39 | 0.42 | 0.57 | 0.60 |
| Ex. 11 | 0.12 | 0.13 | 0.74 | 1.22 | 0.84 |
| Ex. 12 | 0.19 | 0.18 | 0.58 | 0.74 | 0.56 |
| Comp. 8 | 0.25 | 0.23 | — | — | — |
| Comp. 9 | 0.44 | 0.33 | — | — | — |
| Comp. 10 | 0.54 | 0.33 | 0.44 | 0.51 | 0.48 |
| Comp. 11 | — | 0.24 | 0.68 | 1.01 | 0.78 |
| Comp. 12 | — | 0.20 | 0.61 | | 0.75 |
| Comp. 13 | — | 0.17 | 0.78 | 2.44 | |
| Comp. 14 | — | 0.29 | 0.88 | 1.23 | |

TABLE 6

| | Wear Resistance Once | | Wear Resistance 20 times | |
|---|---|---|---|---|
| | Abrasion Width (μm) | Abrasion Depth | Abrasion Width (μm) | Abrasion Depth |
| Ex. 1 | 66 | 0.5 | 84 | 2 |
| Ex. 2 | 102 | 2 | 189 | 6 |
| Ex. 3 | 111 | 2 | 194 | 6 |
| Comp. 1 | 121 | 2 | 212 | 6 |
| Comp. 2 | 126 | 2.5 | 224 | 8 |
| Ex. 4 | — | — | — | — |
| Comp. 3 | — | — | — | — |
| Ex. 5 | 99 | 1 | 158 | 5 |
| Ex. 6 | 111 | 1.5 | 149 | 6 |
| Ex. 7 | 119 | 1.5 | 199 | 6 |
| Ex. 8 | 125 | 2 | 222 | 6 |
| Comp. 4 | 186 | 5 | 293 | 10 |
| Ex. 9 | 91 | 1 | 87 | 1.5 |
| Ex. 10 | 115 | 1.5 | 179 | 5 |
| Comp. 5 | 121 | 1.5 | 198 | 6 |
| Comp. 6 | 189 | 2 | 225 | 6 |
| Comp. 7 | 227 | 5 | 262 | 6 |
| Ex. 11 | 91 | 1 | 92 | 1.5 |
| Ex. 12 | 108 | 1 | 169 | 6 |
| Comp. 8 | 111 | 1 | 149 | 6 |

TABLE 6-continued

| | Wear Resistance Once | | Wear Resistance 20 times | |
|---|---|---|---|---|
| | Abrasion Width (μm) | Abrasion Depth | Abrasion Width (μm) | Abrasion Depth |
| Comp. 9 | 149 | 1.5 | 224 | 8 |
| Comp. 10 | 178 | 2 | 320 | 10 |
| Comp. 11 | 70 | 2 | 213 | 2 |
| Comp. 12 | | | | |
| Comp. 13 | | | | |
| Comp. 14 | | | | |

Example 4 and Comparative Example 3

With respect to a tin-plated product (Example 4) produced by the same method as that in Examples 1-3, except that a tin coating layer having a thickness of 1 μm was formed between the nickel coating layer and the composite coating layer having a thickness of 1 μm, and with respect to a tin-plated product (Comparative Example 3) produced by the same method as that in Examples 1-3, except that a composite coating layer having a thickness of 1 μm was formed between the nickel coating layer and a tin coating layer having a thickness of 1 μm, the coefficient of friction and the contact resistance were evaluated by the same methods as those in Examples 1-3. The results thereof are shown in Tables 1 through 6. As shown in these tables, in Example 4, the coefficient of dynamic friction between the test piece and the tin-plated product treated by the reflow treatment is 0.16, and the contact resistance after being heated at 160° C. for 150 hours is 0.67 mΩ. If the tin coating layer is thus formed as the underlayer below the composite coating layer, it is possible to decrease the contact resistance while maintaining the low coefficient of dynamic friction in comparison with Example 1 wherein the tin coating underlayer is not formed. On the other hand, in Comparative Example 3, the coefficient of dynamic friction between the test piece and the tin-plated product treated by the reflow treatment is a high value of 0.28 since the outermost layer is the tin coating layer.

Examples 5-8 and Comparative Example 4

Tin-plated products having a composite coating of tin and graphite particles having a thickness shown in Table 2 were produced by the same method as that in Examples 1-3, except that scale-shaped graphite particles having a mean particle diameter of 5.8 μm and a particle size distribution of 1.1 to 18.5 μm were used. By the same methods as those in Examples 1-3, the content of carbon in the composite coating of each of the tin-plated products was calculated, and the coefficient of friction, contact resistance and wear resistance of each of the tin-plated products were evaluated. The results thereof are shown in Tables 1 through 6. As shown in these tables, when the thickness of the composite coating is in the range of from 1.2 μm to 9.2 μm as Examples 5 through 8, the coefficient of dynamic friction between the test piece and the tin-plated product treated by the reflow treatment is in the range of from 0.12 to 0.18. In particular, when the thickness of the composite coating is in the range of from 1.2 μm to 4.0 μm as Examples 5 and 6, the coefficient of dynamic friction between the test pieces is also in the range of from 0.17 to 0.19, so that it is possible to obtain a low coefficient of dynamic friction while maintaining an excellent wear resistance. However, when the thickness of the composite coating is 12.7 μm as Comparative Example 4, the coefficients of dynamic friction between the test piece and the tin-plated produce treated by the reflow treatment and between the test pieces are high values of 0.37 and 0.54, respectively.

Examples 9, 10 and Comparative Examples 5-7

Tin-plated products having a composite coating of tin and graphite particles having a thickness shown in Table 2 were produced by the same method as that in Examples 1-3, except that scale-shaped graphite particles having a mean particle diameter of 8.3 μm and a particle size distribution of 1.1 to 31 μm were used. By the same methods as those in Examples 1-3, the content of carbon in the composite coating of each of the tin-plated products was calculated, and the coefficient of friction, contact resistance and wear resistance of each of the tin-plated products were evaluated. The results thereof are shown in Tables 1 through 6. As shown in these tables, when the thickness of the composite coating is in the range of from 1.5 μm to 3.4 μm as Examples 9 and 10, the coefficient of dynamic friction between the test piece and the tin-plated product treated by the reflow treatment is 0.13, and the coefficient of dynamic friction between the test pieces is in the range of from 0.18 to 0.20, so that it is possible to obtain a low coefficient of dynamic friction while maintaining an excellent wear resistance. However, when the thickness of the composite coating is in the range of from 5.7 μm to 13.7 μm as Comparative Examples 5-7, the coefficient of dynamic friction between the test piece and the tin-plated produce treated by the reflow treatment is a high value of 0.21 to 0.39, and the coefficient of dynamic friction between the test pieces is a high value of 0.41 to 0.56.

Examples 11, 12 and Comparative Examples 8-10

Tin-plated products having a composite coating of tin and graphite particles having a thickness shown in Table 2 were produced by the same method as that in Examples 1-3, except that soil-shaped graphite particles having a mean particle diameter of 4.0 μm and a particle size distribution of 0.6 to 37 μm were used. By the same methods as those in Examples 1-3, the content of carbon in the composite coating of each of the tin-plated products was calculated, and the coefficient of friction, contact resistance and wear resistance of each of the tin-plated products were evaluated. The results thereof are shown in Tables 1 through 6. As shown in these tables, when the thickness of the composite coating is in the range of from 0.9 μm to 3.3 μm as Examples 11 and 12, the coefficient of dynamic friction between the test piece and the tin-plated product treated by the reflow treatment is in the range of from 0.13 to 0.18, and the coefficient of dynamic friction between the test pieces is in the range of from 0.12 to 0.19, so that it is possible to obtain a low coefficient of dynamic friction while maintaining an excellent wear resistance. However, when the thickness of the composite coating is in the range of from 6.1 μm to 16.6 μm as Comparative Examples 8-10, the coefficient of dynamic friction between the test piece and the tin-plated produce treated by the reflow treatment is a high value of 0.23 to 0.33, and the coefficient of dynamic friction between the test pieces is a high value of 0.25 to 0.54.

Comparative Example 11

After nickel plating was carried out so as to form a nickel coating layer having a thickness of 1 μm similar to Examples 1-3, a tin-plated product was produced by forming a non-bright tin coating layer having a thickness of 1.4 μm by the same method as that in Examples 1-3, using the same alkylarylsulfonic acid bath as that in Examples 1-3 except that no graphite was added thereto. The coefficient of friction, contact resistance and wear resistance of the tin-plated product thus produced were evaluated by the same methods as those in Examples 1-3. The results thereof are shown in Tables 1 through 6. As shown in these tables, in this comparative example, the coefficient of dynamic friction between the test piece and the tin-plated product treated by the reflow treatment is a high value of 0.24 although the thickness of the tin coating layer is a small value of 1.4 μm.

Comparative Example 12

A substrate of Cu—Ni—Sn alloy (NB-109-EH material produced by Dowa Mining Co., Ltd.) having a thickness of 0.25 mm was put in to a plating bath comprising sulfuric acid (60 g/l), tin sulfate (60 g/l), cresol sulfonic acid (30 g/l) and a surface active agent (1 ml/l) to be electroplated at a temperature of 25° C. and at a current density of 2 A/dm$^2$ to form a tin coating layer having a thickness of 1.1 μm thereon. Then, a reflow treatment was carried out to produce a tin-plated product. The coefficient of friction, contact resistance and wear resistance of the tin-plated product thus produced were evaluated by the same methods as those in Examples 1-3. The results thereof are shown in Tables 1 through 6. As shown in these tables, in this comparative example, the coefficient of dynamic friction between the test pieces (between the tin-plated products treated by the reflow treatment in this comparative example) is 0.2, so that the coefficient of dynamic friction of each of the tin-plated products in Examples 1-12 is equal to or lower than that of the reflow tin-plated product in this comparative example.

Comparative Example 13

With respect to a tin-plated product produced by sequentially forming a bright copper coating layer having a thickness of 1 μm, an SnNi alloy coating layer having a thickness of 0.2 μm, and a tin coating layer having a thickness of 0.4 μm on the same substrate as that in Comparative Example 12, the coefficient of friction, contact resistance and wear resistance thereof were evaluated by the same methods as those in Examples 1-3. The results thereof are shown in Tables 1 through 6. As shown in these tables, in this comparative example, the coefficient of dynamic friction between the test piece and the tin-plated product treated by the reflow treatment is a low value of 0.17, but the contact resistance is a high value of 2.44 mΩ after being heated at 160° C. for 150 hours.

Comparative Example 14

With respect to a tin-plated product by the same method as that in Comparative Example 12, except that the thickness of the tin coating layer was 0.1 μm, the coefficient of friction, contact resistance and wear resistance thereof were evaluated by the same methods as those in Examples 1-3. The results thereof are shown in Tables 1 through 6. As shown in these tables, in this comparative example, the contact resistance is a low value of 1.23 mΩ after being heated at 160° C. for 150 hours, but the coefficient of dynamic friction between the test piece and the tin-plated product treated by the reflow treatment is a high value of 0.29.

As described above, the tin-plated products in Examples 1 through 12 have a lower coefficient of dynamic friction than that of the reflow tin-plated product in Comparative Example 11 and that of the non-bright tin-plated product in Comparative Example 10, and can be used as the material of a terminal wherein the inserting force applied thereto is small.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A tin-plated product comprising:

a substrate; and a coating of a composite material containing carbon particles dispersed in a tin layer, said coating being formed on said substrate and having a thickness of 0.9 to 4.0 μm, said carbon particulate in said coating having a mean diameter of not less than 3.4 to 8.3 μm, the content of said carbon particles in said coating being in the range of from 0.24 wt % to 0.86 wt %, wherein the coefficient of dynamic friction between two pieces of said tin-plated product is in the range of from 0.12 to 0.19.

2. A tinplated product as set forth in claim 1, wherein said coating is formed as an outermost layer of said tinplated product.

3. A connecting terminal comprising;

a female terminal; and a male terminal to be fitted into said female terminal, wherein at least a part of at least one of said female and male terminals contacting the other terminal thereof is made of a tin-plated product as set forth in claim 1.

* * * * *

UNITED STATES PATENT AND TRADEMARK OFFICE

CERTIFICATE OF CORRECTION

PATENT NO. : 7,651,785 B2
APPLICATION NO. : 11/235416
DATED : January 26, 2010
INVENTOR(S) : Takei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Twenty-eighth Day of December, 2010

David J. Kappos

*Director of the United States Patent and Trademark Office*